United States Patent [19]

Tominaga

[11] Patent Number: 5,311,429
[45] Date of Patent: May 10, 1994

[54] MAINTENANCE SUPPORT METHOD AND APPARATUS FOR NATURAL LANGUAGE PROCESSING SYSTEM

[75] Inventor: Masasuke Tominaga, Kawasaki, Japan

[73] Assignee: Hitachi, Ltd., Tokyo, Japan

[21] Appl. No.: 523,355

[22] Filed: May 15, 1990

[30] Foreign Application Priority Data

May 17, 1989 [JP] Japan ................... 1-123846

[51] Int. Cl.$^5$ .............................. G06F 15/38
[52] U.S. Cl. ..................... 364/419.01; 364/419.02; 364/419.08
[58] Field of Search ............. 364/419, 419.01, 419.02, 364/419.04, 419.11, 419.08

[56] References Cited

U.S. PATENT DOCUMENTS

| | | | |
|---|---|---|---|
| 4,654,798 | 3/1987 | Taki et al. | 364/419.07 |
| 4,774,666 | 9/1988 | Miyao et al. | 364/419.02 |
| 4,791,587 | 12/1988 | Doi | 364/419.02 |
| 4,942,526 | 7/1990 | Okajima et al. | 364/419.08 |
| 5,010,486 | 4/1991 | Suzuki et al. | 364/419.05 |
| 5,056,021 | 10/1991 | Ausborn | 364/419.08 |
| 5,079,701 | 1/1992 | Kuga et al. | 364/419.11 |

FOREIGN PATENT DOCUMENTS

| | | |
|---|---|---|
| 62-99865 | 5/1987 | Japan . |
| 63-240676 | 10/1988 | Japan . |
| 1-70871 | 3/1989 | Japan . |

OTHER PUBLICATIONS

Joho Shori of Information Processing Society of Japan, vol. 26, No. 10 (1985) pp. 1174-1190.
SIGNL Notes 54-3 of Information Processing Society of Japan, vol. 86, No. 23 (1986) pp. 1-8.
Transactions of Information Processing Society of Japan, vol. 26, No. 4 pp. 706-714 (1985).
J. Tsujii, "Machine Translation: Future Aspects", Language and Artificial Intelligence, 1987 pp. 265-282.
R. Krishnamurthy, "The Process of Compilation", Looking up–An Account of the Cobuild Project . . . , 1987 pp. 62-80, Appendices 1-5.
M. Nagao, Gengo Kokaku, Published by Shokoudo, 1983, pp. 58-61.
Translated Abstract of: "Transactions of the Information Processing Society of Japan", vol. 26, No. 4 pp. 706-714, 1985.

*Primary Examiner*—Robert A. Weinhardt
*Attorney, Agent, or Firm*—Antonelli, Terry, Stout & Kraus

[57] ABSTRACT

A hypothesis of co-occurrence relation information is generated from sentences and results of processing these sentences. Sentences for verification are generated based on the hypothesis. The adequacy of the sentences generated for verification is judged, and if the sentences are adequate, dictionary information including co-occurrence relation information is generated from the sentences for verification and the hypothesis which is the basis for the verification sentences.

12 Claims, 12 Drawing Sheets

FIG. 3

| CATCH0001 | HE CAUGHT A BAD DISEASE | | | |
|---|---|---|---|---|
| | CATCH | ATRN | KAKARU | |
| | VP71 | SUBJ | HE | KARE |
| | | OBJ | DISEASE | BYOUKI |
| | KARE HA WARUI BYOUKI NI KAKATTA | | | |

FIG. 4

| 41 | 42 | 43 | 44 | 45 | |
|---|---|---|---|---|---|
| CATCH | V | VP71 | ATRN | KAKARU | |
| | | | SUBJ | HUMAN | GA |
| | | | OBJ | DISEASE | NI |

| | |
|---|---|
| HE CAUGHT A BAD DISEASE. | KARE HA WARUI BYOUKI NI KAKATTA |
| TOM CAUGHT AN ILLNESS. | TOMU HA BYOUKI NI KAKATTA |
| THE CHILD CAUGHT THE FLU. | SONO KODOMO HA RYUUKAN NI KAKATTA |
| ... | ... |

⇩

{HYPOTHESIS} | S(HUMAN) CATCH O(DISEASE) | S HA O NI KAKARU |

⇩

| | |
|---|---|
| THE WOMAN CAUGHT INFLUENZA | SONO FUZIN HA INFURUENZA NI KAKATTA |
| I CAUGHT A COLD. | WATASI HA KAZE NI KAKATTA |
| MY FATHER CAUGHT CANCER. | WATASI NO TITI HA GAN NI KAKATTA |
| ... | ... |

| CATCH | V | | | | | |
|---|---|---|---|---|---|---|
| | | | VP71 | ATRN | KAKARU | CERTAINTY FACTOR = 8 |
| | | 1 | SUBJ | HUMAN | | GA |
| | | | OBJ | DISEASE &-CANCER | | NI |
| | | | VP71 | ATRN | HIKU | CERTAINTY FACTOR = 10 |
| | | 2 | SUBJ | HUMAN | | GA |
| | | | OBJ | COLD | | O |

FIG. 7

| CHECK | SOURCE SENTENCE | COR-RECTION | TRANSLATION |
|---|---|---|---|
| | THE WOMAN CAUGHT INFLUENZA | | SONO FUZIN HA INFURUENZA NI KAKATTA |
| | I CAUGHT A COLD. | ∨ | WATASI HA KAZE NI KAKATTA |
| ∨ | MY FATHER CAUGHT CANCER. | | WATASI NO TITI HA GAN NI KAKATTA |
| | THE CHILD CAUGHT PNEUMONIA. | | SONO KODOMO... |
| | ...... | | ...... |

11a

11b:
I CAUGHT A COLD.

| I | : | WATASI (HA) |
| CATCH | : | HIKU |
| A COLD | : | KAZE ( O ) |

WATASI HA KAZE O HIITA

11c:
| ⇐ | ⇒ |
| MENU | — | — | END |

FIG. 11

| CATCH | V | | | |
|---|---|---|---|---|
| | | 1 | VP$_{71}$ | ATRN | KAKARU |
| | | | SUBJ | HUMAN |
| | | | OBJ | DISEASE & -CANCER |
| | | 2 | VP$_{71}$ | ACT | TORAERU |
| | | | SUBJ | HUMAN |
| | | | OBJ | ANIMAL |
| | | ⋮ | ⋮ | ⋮ |
| | | 7 | VP$_{44}$ | PHTR | OITSUKU |
| | | | SUBJ | HUMAN |
| | | | OBJ | HUMAN, VEHICLE |
| | | | PRE | UP>WITH |
| | | ⋮ | ⋮ | ⋮ |

FIG. 12

① NP      V(CATCH)    NP.

② NP(FATHER)   V(CATCH)   NP(COLD).

③ MY FATHER   V(CATCH)   A COLD.

④ MY FATHER   CAUGHT   A COLD.

FIG. 13

① HE [CAUGHT] THE THIEF.
→ THE THIEF WAS [CAUGHT] BY HIM.

② MY FATHER [CAUGHT] A COLD.
→ MY FATHER [CAUGHT] A DISEASE.

③ TOM RAN AS FAST AS HE COULD TO [CATCH] UP WITH THE CAR.
→ TOM RAN AS FAST AS HE COULD TO [CATCH] UP WITH ME.

FIG. 14

① [THE GIRL] IS SITTING IN THE FRONT ROW.

② [THE GIRL] IS MY NIECE.

→ [THE GIRL] SITTING IN THE FRONT ROW IS MY NIECE.

FIG. 16

| CATCH0002 | HE CAUGHT A COLD. | | | |
|---|---|---|---|---|
| CORRECT PARSE DATA | [[HE]_NP [CAUGHT [A COLD]_NP]_VP]_S | | | |
| | HE | PRN | ... | KARE |
| | CATCH | V | ... | HIKU |
| | A | ART | ... | — |
| | COLD | N | ... | KAZE |
| | KARE HA KAZE WO HIITA | | | |
| TRANSLATION RESULT DATA | [[HE]_NP [CAUGHT [A COLD]_NP]_VP]_S | | | |
| | HE | PRN | ... | KARE |
| | CATCH | V | ... | TORAERU |
| | A | ART | ... | — |
| | COLD | N | ... | SAMUSA |
| | KARE HA SAMUSA WO TORAETA | | | |
| MATCHING RESULT | RESULT = FAILURE | | | |

MAINTENANCE SUPPORT METHOD AND APPARATUS FOR NATURAL LANGUAGE PROCESSING SYSTEM

BACKGROUND OF THE INVENTION

The present invention relates to a maintenance support method and an apparatus for a natural language processing system. Particularly, the present invention relates to a maintenance support method and an apparatus for a natural language processing system for processing a sentence written in a natural language which is suitable for supporting maintenance of grammar rules and dictionaries that are used for the processing.

Generally, a natural language processing system is structured by a dictionary and grammar rules for a source language and a processing system which processes an input by applying the grammar rules.

Question answering systems using a natural language and machine translation systems have been studied and developed as a natural language processing system. For example, the following processing is performed in a machine translation system. A sentence of a source language is analyzed by using dictionary information relating to the words of the source language and grammar rules for analysis. Grammar rules for generation are applied to the result of analysis. A sentence (a translation) is generated by using dictionary information of the words of a target language. A translation processing of this type is discussed in the JOHO SHORI of the Information Processing Society of Japan, Vol. 26, No. 10 (1985), pp. 1174–1190.

Some machine translation systems perform processings which take account of semantic information in addition to the processing based on syntactic information, in order to improve the quality of translation. For example, there is a method in which information about co-occurrence relation is stored as dictionary information that shows possibilities of a certain word appearing in a same text with some relation to any other words, and this stored information is utilized to reduce any syntactic or semantic ambiguity that may occur in the course of processing of a natural language sentence.

However, when a sophisticated processing is realized by this method, the amount of information which is necessary for this processing becomes very huge and the information becomes very detailed. As a result, a person who prepares this information is required to have linguistic knowledge and take a heavy work load for this purpose. Accordingly, it has been necessary to employ a method to improve the quality of grammar rules and dictionary information with a small work load.

In order to meet the above purpose or the like, there are methods of surveying linguistic phenomena that appear in actual sentences. As one of those methods, there is one method for surveying with a list called a KWIC (Key Word In Context) list in which sentences including a specific word are listed after sorting sentences that include this specific word. Based on the surveyed result, maintenance of grammar rules and dictionary information are performed manually. A method of this type for analyzing sentences is discussed in the SIGNAL Notes 54-3 of the Information Processing Society of Japan, Mar. 28, 1986.

There are also attempts for reducing human work by (semi) automatically obtaining dictionary information including co-occurrence relation, etc., from actual texts. Transactions of the Information Processing Society of Japan, Vol. 26, No. 4, pp. 706–714 (1985), etc., is relevant to the extraction of this type of dictionary information.

There are also many publications of grammar books and dictionaries for men, and utilization of these publications is also considered. However, such information cannot be used for machine processing without encoding. Depending on the purposes of processing, it is necessary to interpret and encode or structure the information. Such information is based on the assumption that human beings who have world knowledge and experience other than linguistic knowledge, and linguistic phenomena are explained in fractional sentences only. Accordingly, it is necessary to supplement knowledge of missing parts and ambiguous parts in order to prepare a dictionary for machine processing. In actual documents, a variety of linguistic phenomena exist depending on the kinds of documents, and there is no other way than to survey the actual source documents to obtain these detailed phenomena.

The inventors of the present invention have already filed an application (JP-A-1-70871) in relation to the present invention. There is also JP-A-62-99865 as relevant art. These are not relevant to the substance of the present invention.

SUMMARY OF THE INVENTION

It is an object of the present invention to provide a maintenance support method and an apparatus for a natural language processing system which make it possible to easily perform maintenance of information about co-occurrence relation in dictionary information.

It is another object of the present invention to provide a maintenance method and an apparatus for a natural language processing system which make it possible to easily perform verification and correction of grammar rules and dictionary information.

The above objects are based on the inventors' recognition of the below-mentioned problems of the prior art.

Each of the above-described prior art techniques is based on the assumption that there are ample sentences in advance. The prior art techniques make an attempt to prepare comprehensive and detailed grammar rules and dictionary information by surveying these sentences. However, there is a problem that it is almost impossible to prepare sentences in advance that correspond to all the linguistic phenomena because the linguistic phenomena are very complex.

The above-described KWIC list is a mere listing of sentences for easy reference based on a specific word. Therefore, it requires human work to extract linguistic information from the list. Ample sentences are also necessary in order to extract linguistic features.

According to the above-described method of acquiring (learning) information about co-occurrence relation, such information is obtained in accordance with given linguistic data, and the system passively improves its performance each time linguistic data is added. However, this method has a problem that, in order to acquire many exceptions of linguistic phenomena, just a mere passive method is insufficient.

Because of the diversity of grammar rules as well as dictionary information, only general grammar rules are not sufficient, and tuning is necessary according to kinds of documents to be processed. Accordingly, when an end user who has little knowledge of the processing method of a natural language processing system attempts to perform tuning, a specific linguistic phenomenon referred to at that time can be processed well but there is a risk of a side effect that other linguistic phenomena cannot be processed well. Further, there is a problem that it is hard to predict such a side effect at the time when the above tuning is carried out.

When the amount of grammar rules and dictionary information becomes huge, even an expert will find it difficult to grasp all the complex interactions between grammar rules and dictionary information. Any side effect after correction of grammar rules and dictionary information cannot be realized until after sentences have actually been processed. There is also a problem that the sentences for testing are not sufficient if such sentences are only those under which grammar rules and dictionary information have been corrected. Therefore, it is necessary to have a method which makes it possible to easily perform a comprehensive verification of once prepared grammar rules and dictionary information.

In JP-A-63-240676, there is a disclosure of a method for word dictionary registration which enables a user with little knowledge of linguistics to correctly register word information in a word dictionary. However, in this case, the method supports only preparation of case information of words.

The above-described objects of the present invention can be achieved by performing the following in the maintenance support method and apparatus for a natural language processing system with at least a sentence file, grammar rules, dictionary and thesaurus.

Generate a hypothesis of co-occurrence relation from sentences stored in the sentence file and a correct parsing result of processing these sentences. Generate verification sentences which follow the generated hypothesis. Judge the adequacy of these verification sentences. Generate dictionary information including information about co-occurrence relation from the verification sentences of which adequacy has been decided and from the hypothesis which is a basis for the verification sentences. The objects are achieved by taking the above process.

Alternately, the above objects can also be achieved by taking the following steps:

Generating new sentences and a correct result of processing by using the sentences stored in the sentence file, grammar rules, dictionary information and thesaurus, and store the result in the sentence file; processing the generated sentences by the natural language processing system; comparing the processing result with the correct result of processing stored in the sentence file, and analyze the result; and correcting the grammar rules and dictionary information when necessary based on the result of comparison and analysis.

According to the maintenance support method and apparatus for a natural language processing system relating to the present invention, a hypothesis for preparing dictionary information is generated based on the analyzed data, etc., of the sentences which are known to be correct in advance. Generated are verification sentences by using the hypothesis, sentence generation rules, dictionary information, thesaurus and information of other sentences, and their adequacy is decided by the user. The user checks the verification sentences and, for example, the result of translation processing of these sentences to see if the result is correct, and corrects the erroneous portions if any. Truth of the hypothesis is judged based on the sentence data of which adequacy has been decided. If necessary, the hypothesis is corrected, thereby to generate dictionary information and register and result in the dictionary.

According to the maintenance support method for a natural language processing system relating to the present invention, verification sentences are generated by using sentence generation rules, dictionary information, thesaurus and information of other sentences. A result of actually processing these sentences by the natural language processing system is compared with a correct result stored together with the sentences, and the comparison result is shown to the user. The user confirms the above-described result of analysis, thereby to detect problems of the system, if any, and correct the dictionary information and grammar rules.

As described above, it becomes possible to generate dictionary information by a simple method that the user checks the sentences which have been automatically generated by the system. Further, even if sentences are not prepared comprehensively, the system generates the sentences so that knowledge data of system, grammar rules and dictionary information, can be maintained efficiently. Furthermore, when a correct processing result of the sentences obtained by processing the sentences in the natural language processing system, for example, a machine translation system, is stored in the sentence file, a variety of expressions can be obtained for the generation of sentences. Thus, this method makes it possible to improve efficiency of maintenance of knowledge data through daily operation.

Many other features, advantages and additional objects of the present invention will become manifest to those versed in the art upon making reference to the detailed description which follows and the accompanying sheets of drawings.

BRIEF DESCRIPTION OF THE DRAWINGS

FIG. 3 is a diagram showing one example of a data structure of the sentence file.

FIG. 4 is a diagram showing a configuration example of dictionary information of verbs.

FIG. 5 is an explanatory diagram of the process for generating a hypothesis and preparing sentences.

FIG. 7 is a diagram showing one example of the screen of a display unit.

FIG. 11 is a diagram showing one example of the configuration of dictionary information.

FIGS. 12 to 14 are explanatory diagrams for examples of sentence generation rules.

FIG. 16 is a diagram showing one example of the data structure of the sentence file.

DESCRIPTION OF THE PREFERRED EMBODIMENTS

Detailed description of the embodiments of the present invention will be made below with reference to the drawings. In the embodiments to be described below, a machine translation system for translating English into Japanese will be explained, and the present invention can be similarly applied to other natural language processing systems.

Figure 2:
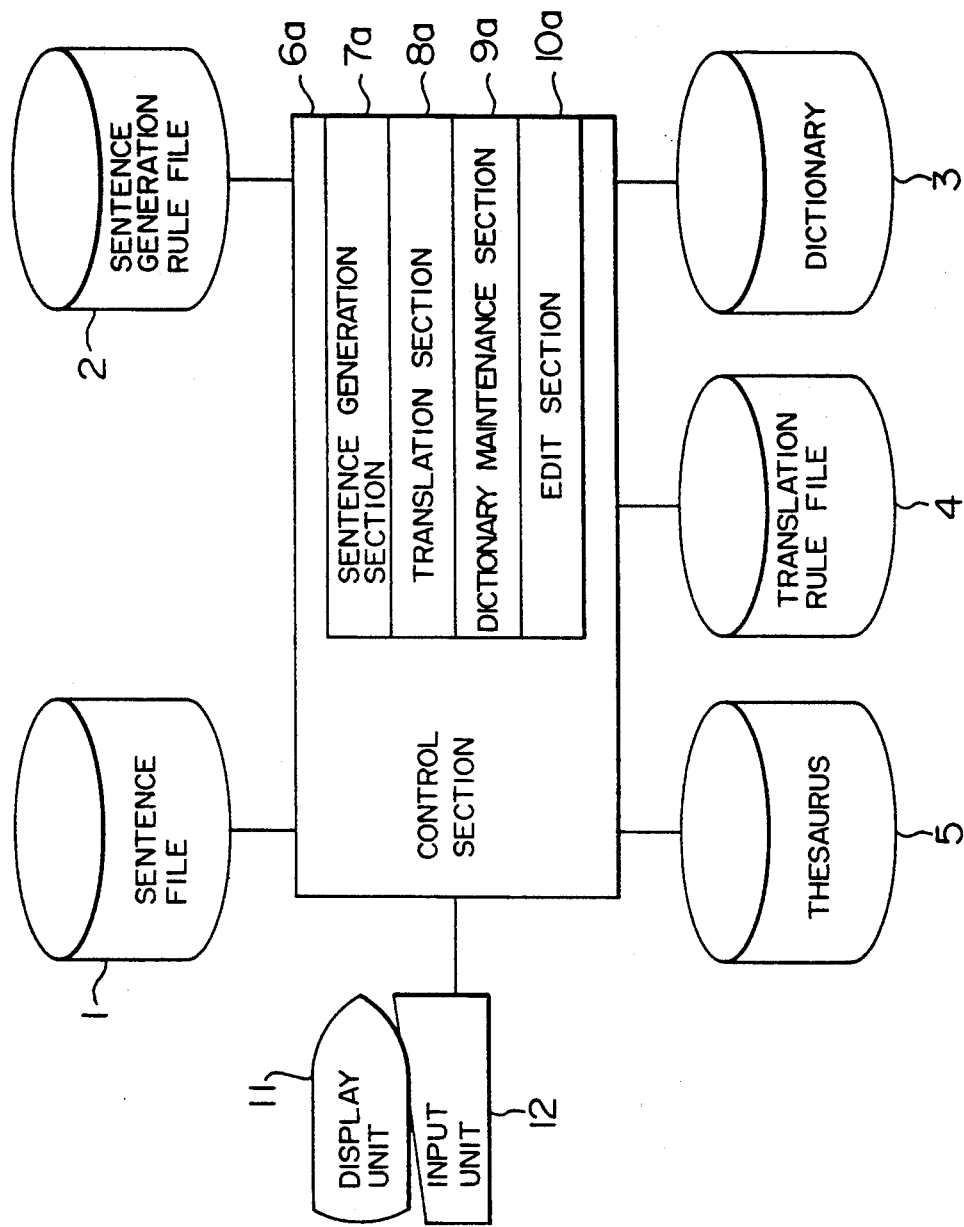
FIG. 2 is a block diagram of the machine translation system having the dictionary maintenance function of the embodiment of FIG. 1.

FIG. 2 is a block diagram of a machine translation system having a dictionary maintenance function which shows one embodiment of the present invention. In this drawing, numeral 1 designates a sentence file for storing sentences and results of translating these sentences. Numeral 2 designates a sentence generation rule file for storing rules for generating sentences. Numeral 3 designates a dictionary which is used for translation and generation of sentences. Numeral 4 designates a translation rule file for storing grammar rules such as analysis rules and generation rules that are used in the translation processing. Numeral 5 designates a thesaurus for storing semantic relations such as "a-kind-of" relation of words and concepts, etc. Numeral 6a designates a control section for controlling various types of processings such as generation and translation of sentences, maintenance of dictionary information and data display and input.

The control section 6a includes the following sections. Numeral 7a is a sentence generation section for generating new sentences by applying the sentence generation rules of the sentence generation rule file 2, based on the information in the sentence file 1, dictionary 3 and thesaurus 5. Numeral 8a designates a translation section for performing translation by applying translation rules to the sentences stored in the sentence file 1 and the sentences inputted to an input unit 12 by the user, based on the information of the dictionary 3 and thesaurus 5. Numeral 9a designates a dictionary maintenance section for generating a hypothesis to generate dictionary information and for generating dictionary information based on the sentence information generated by the sentence generation section 7a from the hypothesis and the information inputted by the user. Numeral 10a designates an edit section having a function of editing sentences, translation results and dictionary information. Numeral 11 designates a display unit which shows the user sentences, translation results, dictionary information and edit data of the edit section 10a. Numeral 12 designates an input unit such as a keyboard or a mouse through which the user inputs data for the sentence generation, translation and editing.

Figure 1:
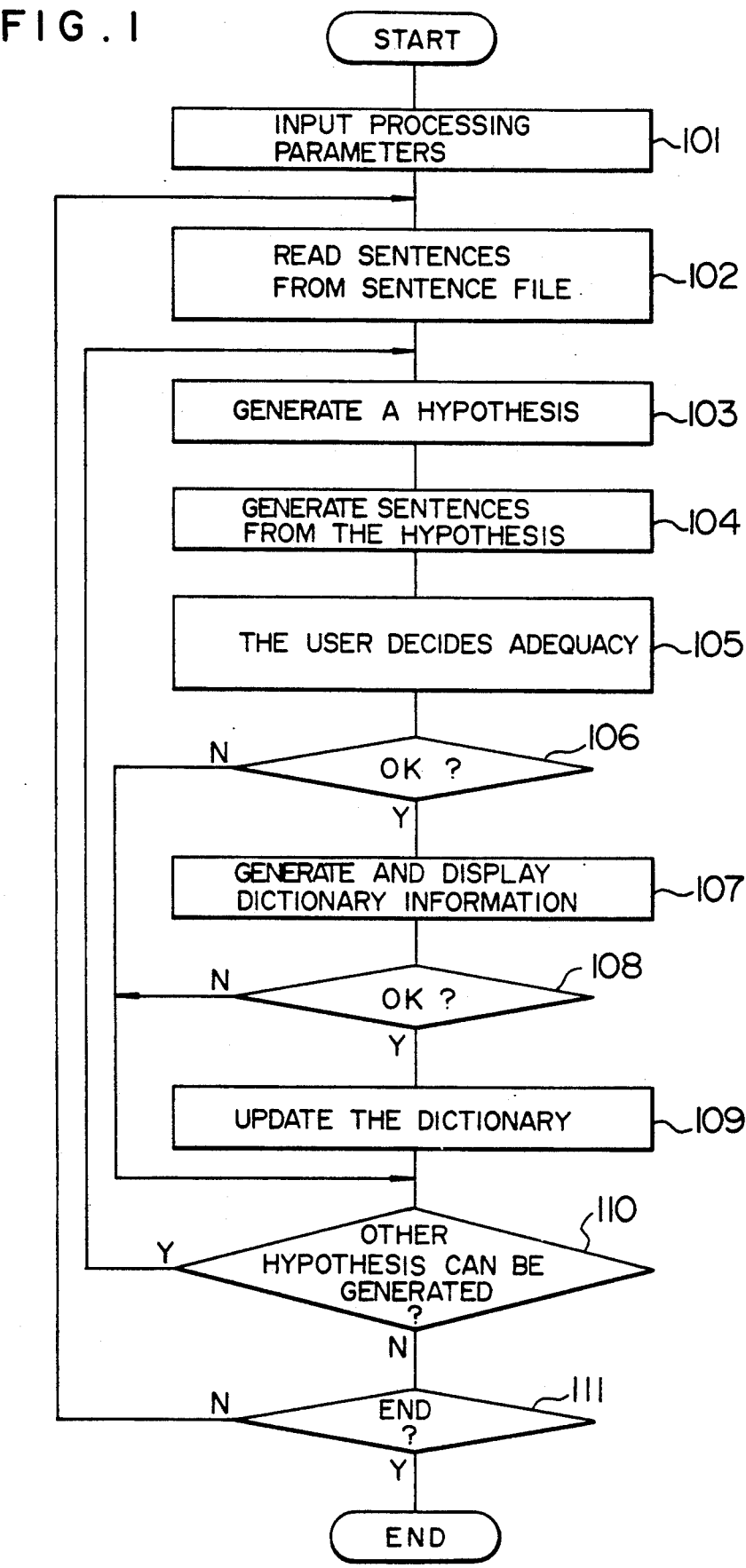
FIG. 1 is a flow chart for the maintenance operation of dictionary information in the machine translation system showing one embodiment of the present invention.

Next, the processing operation of the present embodiment will be described in accordance with the flow chart of the dictionary maintenance operation of the present embodiment shown in FIG. 1.

At first, the user inputs parameters for processing from the input unit 12 (Step 101). The processing parameters include instructions to select processing modes such as sentence generation, translation, dictionary maintenance, etc., and instructions to select the sentence file 1 to be used for the processing, the sentence generation rule file 2, the dictionary 3, the translation rule file 4, the thesaurus 5, etc. Although only one each of the sentence file 1 and the dictionary 3 is shown in FIG. 2, it is possible to assign files which are suitable for specific application fields such as the economic field and the scientific technical field. The input parameters are transferred to the control section 6a, and various processings are started in accordance with the values of the parameters.

In the following description, it is assumed that the dictionary maintenance mode has been assigned as a processing parameter and description will be made of the processing content in the dictionary maintenance mode which is a central part of the present embodiment.

When the dictionary maintenance mode and the files of dictionaries and the like to be used are assigned, the control section 6a asks the user to input a word for the maintenance of dictionary information. Based on this instruction, the user inputs a word for the maintenance of the dictionary information to the input unit 12. The control section 6a transfers the input word to the dictionary maintenance section 9a and instructs the input word to be used for the maintenance of the dictionary information. The dictionary maintenance section 9a retrieves sentences which include the word assigned by the user from the sentence file 1 (Step 102).

In the sentence file 1, sentences, their analysis data and translated sentences are stored with concatenation of a word and a sentence number as a key, as shown in FIG. 3, for example. It is also possible to store data which are the result of human translation or machine translation, as the data which have been confirmed as correct.

FIG. 3 shows that the key is "CATCH 0001", the source sentence is "He caught a bad disease.", the key word is "CATCH", and its translated word (in Japanese) is "Kakaru, become infected with", ATRN is a semantic attribute code which means that the meaning of the verb "CATCH" is an attribute transfer. The next field shows the case frame of the verb "CATCH". VP71 indicates that the verb pattern is SVO, and further SUBJ (Subject) is "He" of which translation is "Kare", and OBJ (Object) is "disease" of which translation is "Byouki". The last field stores a translation of the source sentence.

In the present embodiment, in order to explain how to obtain co-occurrence relation information of a verb, only the information pertaining to the structure based on a verb is shown in the analysis data in FIG. 3. However, it is also possible to extend the system to deal with the structure of a whole sentence and information of all constituent words.

FIG. 4 shows one example of simplified dictionary information of a word. This dictionary information stores an index word 41, a part of speech 42, a verb pattern 43, a semantic attribute 44, a translation 45, co-occurrence relation information 46 which shows conditions of a noun that can become a subject or an object, and a Japanese postposition which is used in a Japanese translation. This example shows that in the case of "CATCH", the part of speech is a verb (V), the verb pattern is VP71 (SVO), the semantic attribute is ATRN, and the translation is "Kakaru". It further shows that there is co-occurrence relation between a noun which indicates "human" as a subject and a noun which indicates "disease" as an object. Both "HUMAN" and "DISEASE" are semantic attribute codes which indicate the concepts of "human" and "disease" respectively. It also shows that both the subject and the object use "ga" and "ni" respectively as postpositions in the translation (Japanese).

The dictionary maintenance section 9a divides a plurality of sentence data read in the format shown in FIG. 3 into many groups based on an attribute value of a word which becomes a key, for example. When the word which becomes a key is a verb, it is possible to divide sentence data into groups based on its translation and verb pattern.

FIG. 5 shows an example in which a verb "CATCH" has a translation of "Kakaru" and sentences of which a verb pattern is VP71 (SVO) are collected. In the grouping, the user can assign attributes to group the sentences by, or it is also possible to preset the attributes depending on the part of speech of the key word. It is also possible to structure a sentence file itself in advance by paying attention to the attribute value of the word.

Next, the dictionary maintenance section 9a chooses one of the groups and prepares a hypothesis of dictionary information based on a plurality of sentences which belong to the group chosen (Step 103). In the above selection of a group, the user can assign which group to choose, or it is also possible to choose one group which includes many sentences. It is also possible to choose one group at random from the groups that include sentences of which a number exceeds a certain threshold value.

As one of the methods for generating the above-described hypothesis, some tendency of appearance of a noun at the position of the subject of "CATCH" and that of a noun at the position of the object is checked, and a hypothesis is generated by using the meanings of nouns that appear frequently. In other words, a hypothesis of co-occurrence relation information is generated based on the heuristics that words having a similar semantic attribute often appear in the same context. In the case of FIG. 5, the dictionary maintenance section 9a prepares a hypothesis as shown in the drawing based on the tendency that a noun or a pronoun denoting a human appears as the subject and a noun denoting a disease appears as the object in this case. This hypothesis expresses the information that "CATCH" takes such a pattern that its subject is "human" and its object is "disease" and that "CATCH" is translated as "Kakaru". Since the hypothesis is generated based on only part of the tendencies of a limited number of sentences, it is not always true. Accordingly, it is necessary to check if there is some sentence which is not suitable to meet the hypothesis.

Next, the dictionary maintenance section 9a transfers the generated hypothesis to the sentence generation section 7a through the control section 6a. The sentence generation section 7a generates new sentences based on the transferred hypothesis (Step 104).

Figures 6, 8:
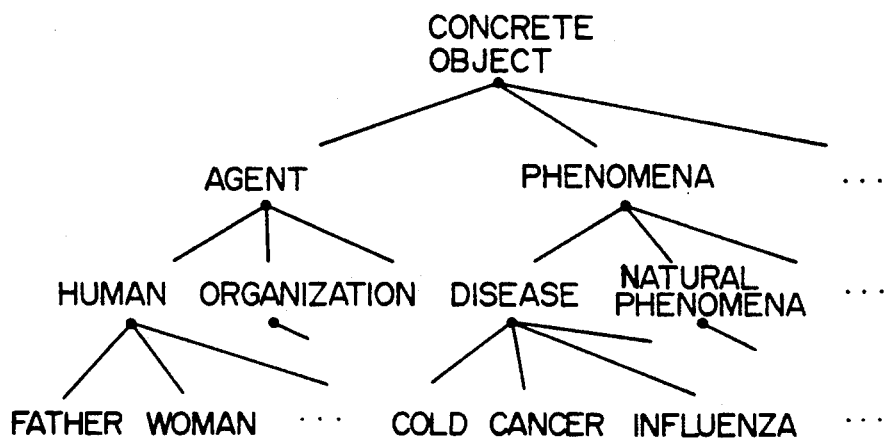
FIG. 6 is a diagram showing one example of thesaurus.
FIG. 8 is a diagram showing one example of dictionary information of verbs generated by the dictionary maintenance section.

It is basically possible to generate a sentence by replacing the semantic attribute code in the hypothesis with an actual word which is an example of the semantic attribute. In this case, a word positioned at a lower level of the concept shown by the semantic attribute code is used by referring to the thesaurus 5, as shown in FIG. 6. For the selection of words, a plurality of typical instances and peripheral instances correspond to each concept and these words are used, or alternately, the words can be selected at random from the words shown at the lower level of the assigned concept. Further, suitable articles are added, a tense is decided, and the verb is made to agree with the subject in number and person, by applying the rules of the sentence generation rule file 2. A translation corresponding to the generated sentence is also generated in accordance with the hypothesis.

In this case, translation of a noun phrase corresponding to a subject and an object can be acquired by starting the translation section 8a. A number of sentences to be generated can be decided by the user, who presets a number necessary for the verification of a hypothesis as a parameter.

When sentences as shown at the lower portion of FIG. 5 are generated by the sentence generation, the sentence generation section 7a displays the data of the generated sentences in the display unit 11 through the control section 6a, and asks the user to verify the hypothesis. In other words, the user decides the adequacy of the sentences prepared in accordance with the hypothesis and their translations (Step 105).

FIG. 7 shows an example of the picture displayed in the display unit 11. Numeral 11a designates a display window for the sentences and their translations, 11b designates a window for correcting the translations, and 11c designates a menu window.

At first, the user checks whether the sentences (source sentences) are adequate or not by referring to the window 11a. In the drawing, a third sentence from the top is not adequate as English, and therefore a mark is ticked in its check column to indicate the inadequacy of the English sentence. The user refers to all the sentences by using the scrolling function in the menu, and ticks a mark in the check column of an inadequate sentence by using a mouse or the like.

In the case where the source sentence is correct but its translation is not correct, it is possible to open the translation correction window 11b by selecting the column for correcting the translation by using a mouse. In the drawing, the translation of the second sentence from the top is inadequate as Japanese, and a translation by phrase is displayed between the source sentence and the translation in the translation correction window 11b. Those words shown in the brackets are postpositions added to the subject or the object. Since in the case of this sentence, "Kaze wo hiku" is more natural than "Kaze ni kakaru" as Japanese, the user has corrected the translation of "CATCH" and the postposition to be added to "Kaze".

It is possible to facilitate confirmation of the above-described correction portions by a reversal indication or a blink indication as shown in the drawing. It is also possible to automatically correct the whole translation sentence in the translation correction window 11b based on the result of correction of translation by phrase.

After finishing the correction, the screen returns to the sentence display window 11a by selecting the END section of the menu 11c with the mouse.

When the decision of adequacy of all the sentences and their translations is over by taking the above procedure, the user finishes all the processing by selecting the END in the menu 11c with the mouse.

After the decision of adequacy of the sentences is finished, the sentence data after the decision are transferred to the dictionary maintenance section 9a through the control section 6a. The dictionary maintenance section 9a combines the transferred sentence data with the sentence data read in advance from the sentence file to decide whether the hypothesis has been correct or not.

Based on the ratio of the number of sentences which have been decided as adequate to the total number of sentences prepared, the degree of plausibility of the hypothesis can be decided. A threshold value of this ratio can be preset as a parameter by the user. When the ratio of the number of sentences that have been decided as adequate exceeds this threshold value, it is decided that the hypothesis is correct, based on which dictionary information is generated. If the ratio is not larger than this threshold value, the hypothesis is abandoned, and the processing skips to Step 110 (Steps 106 and 107).

FIG. 8 shows an example of dictionary information prepared by the above-described processing. This table shows the degree of validity (or certainty factor) of each co-occurrence relation information which is added to the format of the dictionary information in FIG. 4. This certainty factor can be set by taking into account the number of sentences that have been considered at the time of generating each co-occurrence relation information and the level of generalization. In the case of FIG. 8, the dictionary information 1 has a score of 8 points out of a full score of 10 points for its certainty factor because the OBJ (Object) condition of the co-occurrence relation information is generalized and there is a possibility of an exception appearing. However, the dictionary information 2 is scored as 10 points for its certainty factor because it is almost certain that this information is relevant to co-occurrence with only the word "cold". As a format of dictionary information, the format excluding the section of certainty factor can, of course, be taken as shown in FIG. 4.

The system has automatically changed the postposition of the subject from "ha" in the sentences to the postposition of "ga" for a nominative case, for both dictionary information 1 and 2 in FIG. 8.

In the dictionary information shown in FIG. 8, the hypothesis is not set directly as the dictionary information, but the dictionary information is generated by taking into account the result of check and correction performed by the user in the above-described Step 105. In other words, in the dictionary information 1, "-cancer" is added as a condition of the object to indicate that this expression is not applied to the case of "cancer", although it is one of the diseases, based on "My Father caught cancer." which has been pointed out as an exception of the hypothesis in Step 105.

In this case, the system decision that the object "cancer" is inadequate and the subject "father" is not inadequate can be made by making the system ask the user which portion is wrong when the user checked that this sentence is not adequate. It is also possible to make the system make this decision by arranging such that a separate sentence is generated by using "father" as a subject or by using "cancer" as an object and that the user is asked to decide adequacy of this sentence.

The above dictionary information 2 is automatically generated from the result of correcting the translation in the above-described Step 105. When there is no correction by the user in the above Step 105, the hypothesis is used as it is for the dictionary information. Next, when the dictionary maintenance section 9a has generated the dictionary information as shown in FIG. 8, this information is transferred to the display unit 11 through the control section 6a and displayed (Step 107). The user confirms whether there is any problem or not in the displayed information, and registers this information in the dictionary if there is not problem (Steps 108 and 109). If there is a problem in the information, the information can be corrected on the spot and registered in the dictionary, or the hypothesis itself may be abandoned and the processing is skipped to Step 110.

If the same information has already been registered at the time of updating the dictionary, only the certainty factor may be updated in the dictionary information shown in FIG. 8, thereby to prevent the same information from being registered in duplication.

Once the hypothesis has been approved and the dictionary information has been updated or the hypothesis has been abandoned, it is confirmed if it is possible to generate a further different hypothesis based on the sentences read in Step 102. If it is possible to generate a further hypothesis, the above-described maintenance of dictionary information is performed in the similar manner by using the new hypothesis generated. If it is not possible to prepare a further hypothesis, the system asks the user if there is a further word of which dictionary information the user want to maintain. If the answer is yes, the processing goes back to Step 102, and the above-described maintenance of dictionary information is performed in a similar manner. If the answer is no, the processing is terminated (Step 111).

After the above-described processing of the dictionary maintenance mode is over, the user can make the system translate a document by using the generated dictionary. When the translation mode is selected in Step 101 of FIG. 1, the user can have a document translated at the translation section 8a by assigning the dictionary 3 and the translation rule file 4 to be used. The processing method will not be specified here.

According to the above-described embodiment, when the user has collected typical sentences in the application domain of machine translation, the system will automatically generate new expressions by utilizing these sentences. Therefore, it becomes possible to acquire more co-occurrence relation information in a simple manner just by involving the user's check operation of the adequacy of the generated expressions.

Since there is a high possibility that new sentences and result of correct analysis of these sentences are obtained each time translation is executed, various expressions can be acquired for the generation of sentences if the translation data are accumulated in the above-described sentence file 1, and much co-occurrence relation information can be acquired with higher precision as a result.

Further, since the system automatically generates separate sentences in addition to the accumulated sentences and actively asks the user to decide the adequacy of these sentences according to the above-described embodiment, detection of exceptions and generalization of co-occurrence relation information can be properly performed in an easy manner. Furthermore, since once registered information can also be updated automatically through detection of exceptions, it becomes possible to progressively enhance the accuracy of the dictionary information.

In the above embodiment, description has been made by taking an example of acquiring information pertaining to the co-occurrence relation between a verb and its case elements. The processing method according to the present embodiment can also be applied to the acquisition of information pertaining to co-occurrence relation between an adjective and a noun to be modified by the adjective and co-occurrence between a prepositional object centered around a preposition and its modifying destination, in addition to co-occurrence relation between a verb and its case elements.

As a modification of the present invention, it is considered that words for maintaining dictionary information are also automatically selected. In other words, those words for maintaining dictionary information are assigned by the user in the above embodiment, but this selection can also be performed automatically. For example, when the frequencies of the words appearing in sentences stored in the sentence file 1 are calculated beforehand and words are selected at random from those which have high frequency of appearance, it becomes possible to efficiently perform maintenance of dictionary information. The larger the number of sentences to be referred to, the higher the possibility of generating a hypothesis with certainty. It becomes possible to generate a hypothesis more efficiently if the word appearance frequencies are calculated by values of their attributes, for example, by verb patterns or translated words in the case of verbs.

As a further modification of the present embodiment, it is considered that sentences in the sentence file 1 are grouped by words and their attributes included in these sentences and a table is prepared to manage the sentences by the group units, and that for the groups of sentences pertaining to the dictionary information that has already been prepared and registered, their histories are recorded in the table, thereby to avoid duplication of the maintenance of dictionary information. Further, when the certainty factors added to the dictionary information in FIG. 8 are recorded together with their histories in the table, it becomes possible to automatically start the maintenance for dictionary information for those sentence groups pertaining to dictionary information of smaller certainty factors when more sentences of the similar group have been collected, even if the dictionary information has already been generated and registered.

As a further separate modification of the above embodiment, it is also possible to limit the words to be included in the sentences when the dictionary and thesaurus to be used for the sentence generation are prepared separately from those used for the translation processing. In this case, it is possible to generate dictionary information based on sentences that include important words in accordance with the kinds of documents which the user intends to have translated. Therefore, the maintenance of dictionary information can be performed more efficiently.

A second embodiment of the present invention will be described below.

In the present embodiment, description will be made of a machine translation system which translates English into Japanese, but the present invention can also be applied to other natural language processing systems.

Figure 9:
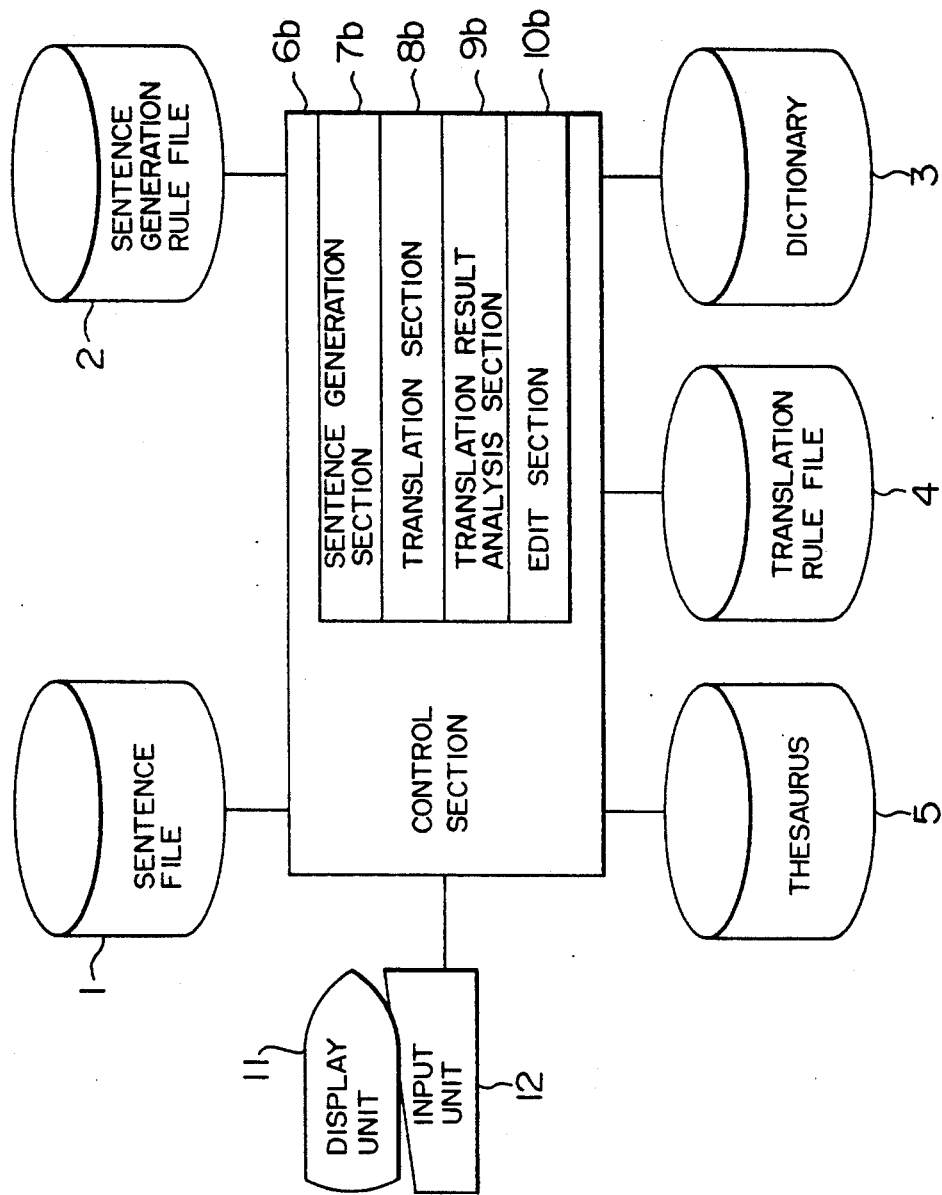
FIG. 9 is a block diagram showing another embodiment of the present invention.

FIG. 9 is a block diagram of a machine translation system having the dictionary information maintenance function which shows one embodiment of the present invention. In the drawing, reference numerals 1 to 5 designate the configuration elements which are the same as those shown in the first embodiment, that is, they designate the sentence file, sentence generation rule file, dictionary, translation rule file and thesaurus, respectively.

Numeral 6b designates a control section for controlling various processings such as the sentence generation, translation, analysis of translation results, display and input of data, etc. The control section 6b includes a sentence generation section 7b for generating new sentences based on the information of the file 1, dictionary 3 and thesaurus 5 by applying sentence generation rules of the sentence generation rule file 2, a translation section 8b for performing translation by applying translation rules to the sentences stored in the sentence file 1 and the sentences inputted to an input unit 12 by the user, based on the information of the sentence generation section 7a, dictionary 3 and thesaurus 5, a translation result analysis section 9b for analyzing the translation result transferred from the translation section 8b, and an edit section 10b for editing the sentence generation rules, dictionary information, translation rules, etc.

Numeral 11 designates a display unit for the user to confirm sentences generated by the sentence generation section 7b, result of translation by the translation section 8b, result of analysis of the translation by the translation result analysis section 9b, and edit data by the edit section 10b. Numeral 12 designates an input unit such as a keyboard and a mouse with which the user inputs data for the sentence generation, translation processing and edit processing.

Figure 10:
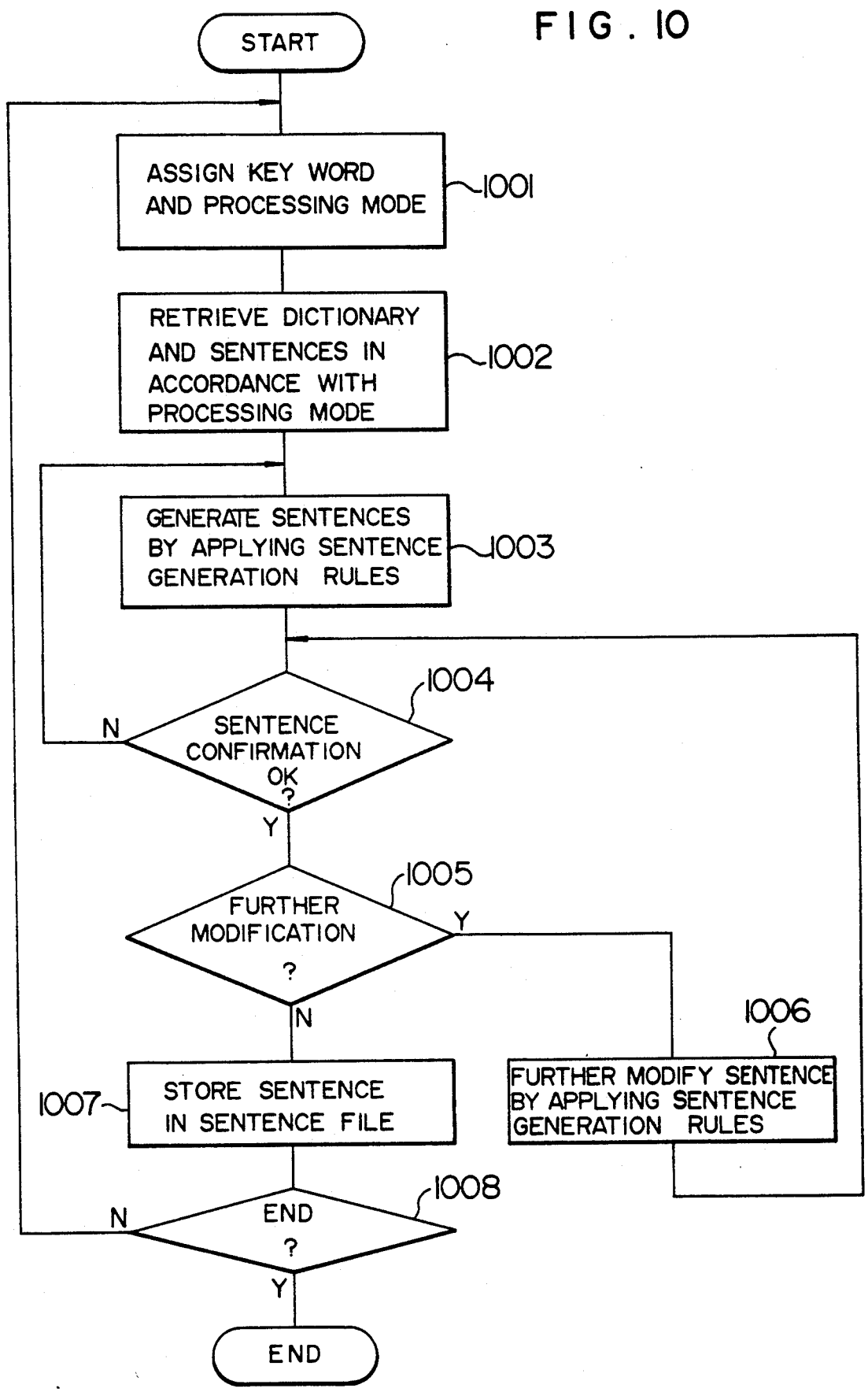
FIG. 10 is a flow chart for explaining the processing operation of the sentence generation section in FIG. 9.

Among the processing operations of the present embodiment, the operation of the sentence generation section 7b will be explained below in accordance with the flowchart shown in FIG. 10.

When the user instructs generation of sentences at the input unit 12, the control section 6b starts the operation of the sentence generation section 7b. The started sentence generation section 7b asks the user to input a key word which becomes a key of the sentences to be generated and a processing mode for the preparation of sentence to be described later. Based on this instruction, the user inputs the necessary data from input unit 12 (Step 1001).

In this case, in a similar manner as that for the preceding embodiment, it is possible to arrange such that the user can assign which file to use in instructing sentence generation from the input unit 12, when there are a plurality of the sentence files 1, dictionaries 3, sentence generation rule files 2 and thesauruses 5 that are used for the generation of sentences.

As the processing modes which are the methods of generating sentences, the following are considered.

(1) When the key word is a verb, generate a sentence based on the dictionary information of this verb (Mode 1).

(2) Retrieve only one sentence from the sentences that include the key word from the sentence file 1 and modify the retrieved sentence thereby to generate a new sentence (Mode 2).

(3) Retrieve a plurality of sentences that include the key word from the sentence file 1 and combine these sentences thereby to generate a new sentence (Mode 3).

Next, the contents of the processings in the above three modes will be explained in detail.

The sentence generation section 7b retrieves the dictionary 3 and sentence file 1 and reads the dictionary information and sentences in accordance with the user assigned key word and processing mode (Step 1002). Then, the sentence generation section 7b applies the dictionary information and sentence generation rules in the sentence generation rule file 2 to the sentences in accordance with the processing mode, thereby to prepare new sentences (Step 1003).

The processing contents of the above three kinds of modes will be explained below by using examples.

(1) Mode 1:

In Mode 1, sentences are generated based on the dictionary information of the assigned key word, without using the sentences already generated. FIG. 11 shows one embodiment of dictionary information. The meaning of each constituent unit is the same as that of the same portion shown in FIG. 4 that has been used for the explanation of the first embodiment, except in FIG. 11 a plurality of entries are shown. For example, the dictionary information "1" in FIG. 11 covers the information that the index word CATCH is a verb (V) as a part of speech, takes a pattern of VP71 (SVO) as a verb pattern, takes a noun that expresses "hito: human" as a subject, takes a noun that expresses "byoki: disease" are an object, takes a translation of "kakaru" when the object is other than "cancer", and takes "attribute transfer" denoted by ATRN as its semantic attribute.

Further, the dictionary information "7" covers the information that a verb pattern is VP44 (S+V+up+-with+O), takes a noun that expresses "hito: human" as a subject, takes a translation of "oitsuku: be in time for" when the object takes a noun that expresses "hito matawa norimono: human or vehicle", and takes "physical positional transfer" denoted by PHTR as its semantic attribute. Here, HUMAN, DISEASE, ANIMAL and VEHICLE are codes all expressing the meanings of nouns, which express the concepts of "human", "disease", "animal" and "vehicle", respectively. Similarly, ATRN and PHTR are codes which express the meanings of the above-described verb.

Further, the section of PRE in the dictionary information "7" in FIG. 11 is the place where adverbial particles (adv.) and prepositions (pre.) included in the verb pattern VP44 (S+V+adv.+pre.+O) and other verb patterns are assigned.

In generating sentences of Mode 1, either the user directly assigns a certain entry or the system determines an entry at random out of a plurality of entries of information (dictionary information 1, dictionary information 2, ... ) in FIG. 11, and sentences which match the selected information are generated by applying the sentence generation rules.

FIG. 12 shows a process of generating a sentence by applying sentence generation rules to the dictionary information "1" in FIG. 11. In this drawing, V and NP are phrase markers which express a verb and a noun phrase, respectively.

To be more specific, a main structure of the sentence is determined based on the information of the verb pattern (①). Next, a main section of the noun phrase is determined so as to satisfy the information of co-occurrence relation of the verb by referring to the thesaurus as shown in FIG. 6 (②). Dictionary information of the noun in the main section of each noun phrase is retrieved from the dictionary 3, and a suitable modifier or article is added to each noun in accordance with this retrieved information (③). Last, the tense of the verb is determined and the verb is made to agree with the noun in the subject in number and person, thereby to change the verb (④). Thus, a sentence is generated.

In determining each word for structuring a sentence and its attribute, it is possible to determine them based on the instruction received from the user, or they can be determined at random within the range in which various constraints are satisfied that are given by the sentence generation rules and information of co-occurrence relation of the verb, in the case where there are a plurality of selection alternatives.

(2) Mode 2:

In Mode 2, new sentences are generated by modifying sentences already generated that have been retrieved from the sentence file 1 by applying sentence generation rules to these sentences, based on the word assigned by the user. FIG. 13 shows an example of the application of sentence generation rules related to Mode 2.

FIG. 13 shows modification of sentences including the English word CATCH and its conjunctions as key words, based on the dictionary information shown in FIG. 11 and the information of the thesaurus 5. For example, ① is an example of applying the rule to change the sentence to a passive voice, and ② shows that the object "a cold" controlled by the "caught" is changed to a "a disease" that has the same superconcept in the thesaurus. In other words, those rules are used which are applied to replace words and phrases to be controlled by the key word with other words and phrases that have similar semantic attributes. In ③, the object "the car" of the verb pattern (S+V+up+-with+O) of "catch" is changed to "me" which is a word for expressing "human", within the range for meeting the information of co-occurrence relation (HUMAN, VEHICLE). The rules that are used in this case are those which are applied to replace words to be controlled by the key word with other words and phrases within the range of meeting constraints by the key word.

In the case of the application of sentence generation rules including replacement of words such as shown in ② and ③, it is also possible to simultaneously apply the rules of addition and deletion of articles explained in the section of Mode 1 and the rules for agreement, thereby to maintain structural adequacy, although this is not shown in FIG. 13. Although examples based on a verb are explained in FIG. 13, the rules for ② and ③ can also be applied to the case where nouns, adjectives and adverbs are the key words in addition to verbs. The sentence generation rules in Mode 2 can be considered in addition to the rules shown in FIG. 13, and those rules can be changed depending on the words to be changed.

(3) Mode 3:

In Mode 3, a plurality of sentences which include a word assigned by the user are retrieved from the sentence file 1, sentence generation rules are applied to these sentences, and these sentences are combined together to generate a new sentence. In FIG. 14, two sentences each of which includes the same word "girl" are combined in such a way that the sentence of progressive present in ① is combined in the form of attributive use of a present participle as an attributive phrase of "girl" in the sentence in ②. As a sentence generation in Mode 3, it is also possible to a selectively extract arbitrarily two sentences from the sentence file 1, apply sentence generation rules to these sentences, and combine the two sentences if the rule assumptions are satisfied, in addition to combining two sentences which include words that have been assigned by the user. In combining two sentences, it is also possible to simultaneously apply modification rules for sentences explained in the section of Mode 2.

As explained above, when a sentence has been generated in accordance with the mode assigned by the user, the sentence generation section 7b transfers this sentence to the display unit 11 and displays the sentence through the control section 6b, and asks the user for his or her decision about the adequacy of this sentence (Step 1004).

In this case, the user may just answer whether the sentence is adequate or not, or the user may correct the sentence in an adequate form, if the sentence is not adequate, and return the result to the sentence generation section 7b. This confirmation is made in order to exclude a sentence which is structurally or semantically inadequate, and to prevent generation of many similar sentences. While confirmation of sentences is carried out interactively in the present embodiment, it is also possible to confirm sentences in a batch manner. When a sentence has been decided to be inadequate by the user, the processing returns to Step 1003, and sentence generation is attempted again.

When a sentence has been decided to be adequate, it is confirmed whether the generated sentence is to be further modified or not (Step 1005). When the user has decided that it is necessary to further modify the sentence, the sentence modification processing is performed by the above-described processing of Modes 2 and 3 (Step 1006).

In this case, if it is necessary, another sentence is retrieved from the sentence file 1. Regarding kinds of modification or sentence generation rules to be applied, it is possible to ask for instructions from the user, or it is also possible to automatically retrieve sentence generation rules that can be applied. When a plurality of sentence generation rules can be applied, one or more rules can be selected at random.

On the other hand, when it is not necessary to modify the sentence generated in Step 1005, this sentence is stored in the sentence file 1 (Step 1007). In this case, the attribute value and the translation of each word when the sentence has been correctly analyzed and translated are stored together with the sentence. It is possible to automatically generate correct parse data based on dictionary information of the word which has been used to generate the sentence, data of the sentences already generated and information of sentence generation rules that have been applied. When part of the correct parse data is missing or when it is not possible to decide correct parse data, it is possible to ask the user for his or her instructions.

FIG. 16 shows one embodiment of the structure of data which is to be stored in the sentence file 1. In FIG. 16, structural units stored in the sentence file 1 are a key constituted by a concatenation of a key word and a sentence number, a source sentence, a parse tree of the source sentence, attribute values and a translation of each constituent word of the source sentence in the case of a correct translation and in the case of a translation performed in the translation section 8b, and a result of matching between the correct translation and the translation performed in the translation section 8b.

In the example of FIG. 16, the key is "CATCH 0002" and the source sentence is "He caught a cold." The first field of the correct parse data is a parse tree of the source sentence showing a shows phrase structure of the source sentence by using brackets, and NP, VP and S as phrase markers which represent a noun phrase, a verb phrase and a sentence, respectively. In the following four fields, attribute values and translation of constituent words of the source sentence corresponding to the correct translation "Kare ha kaze wo hiita." are set, and the next field is for a correct translation of the source sentence. The meaning of each field of the translation result data is the same as that of each corresponding field of the correct parse data. Since the data of an actual result of translation performed in the translation section 8b is set here, the data is not always correct. In this example, data corresponding to the wrong translation of "Kare ha samusa wo toraeta: He caught the cold weather." is entered. Therefore, the data is different from the content of the correct parse data. Accordingly, the information "failure" which means that the correct parse data is different from the translation result data is entered in the last field which is a matching result.

Figure 15:
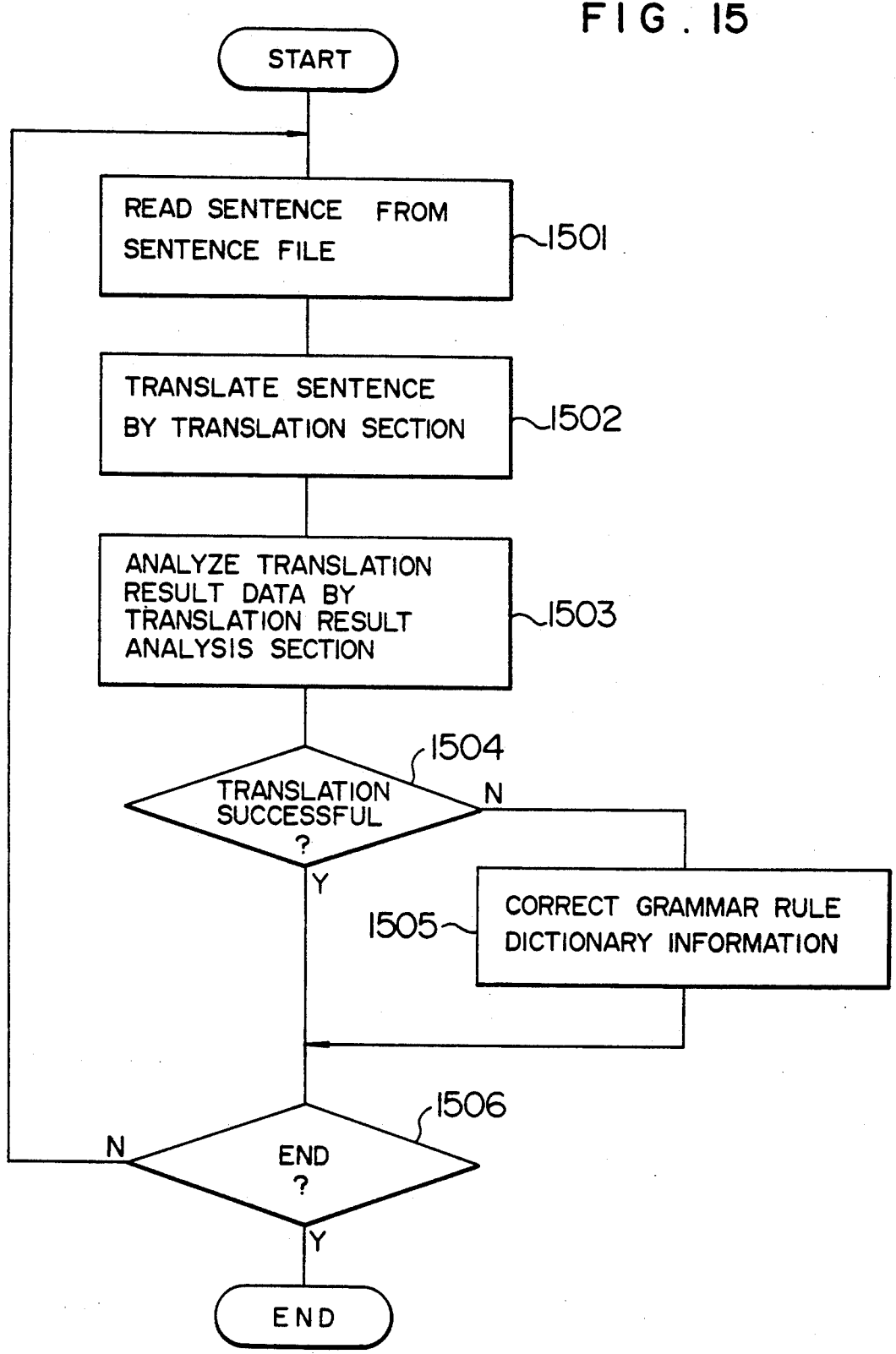
FIG. 15 is a flow chart of the processing operation of the maintenance function in the embodiment of FIG. 9.

No information is entered in the columns of the translation result data and the matching result at the stage when a sentence has been generated, and information in these columns is set at the process of experimental translation to be described later. Next, experimental translation using a sentence that has been generated as described above and methods of maintenance of translation rules and dictionary information will be explained based on FIG. 15.

When the user instructs experimental translation by the input means 12, the control section 6b starts the translation section 8b. The started translation section 8b asks the user to give instructions about the sentence to be translated, and reads the sentence from the sentence file 1 in accordance with an input by the user (Step 1501).

Next, the translation section 8b translates the sentence, edits the translation result data in the data structure shown in FIG. 16, and transfers the result to the translation result analysis section 9b (Step 1502). The translation result analysis section 9b performs matching of the correct translation data with the translation data by the translation section 8b out of the transferred data, thereby to judge whether the translation result is as initially intended or not, and writes the result in the matching result field (Steps 1503 and 1504).

When the translation result is a failure, the data is shown to the user by the display unit 11, and the edit section 10b is started to correct the translation rules and dictionary information. The user searches causes of the translation failure by referring to the translation result data and correct parse data, and depending on the result, corrects the translation rules and dictionary information by the edit section 10b (Step 1505).

The above-described processing is repeated for other sentences as well (Step 1506).

Regarding the above-described method of experimental translation and maintenance of translation rules and dictionary information, the method is not limited to the above-described interactive processing state, but it is also possible to employ the system where a large volume of sentences are translated in a batch, the sentence data shown in FIG. 16 are stored in the sentence file 1, and after finishing experimental translation, sentence data of translations in failure shown by the matching result are collectively referred to, thereby to correct the translation rules and dictionary information in a batch manner.

As explained above, according to the present embodiment, even if it is impossible to acquire comprehensive sentences beforehand, it becomes possible to prepare a variety of test sentences by the sentence generation section 7b. Therefore, translation rules and dictionary information of the machine translation system can be maintained easily and efficiently by referring to the result of actual translation processing of the test sentence, and detection of the above-described side effect following the modification of the dictionary information and/or translation rules becomes easy.

Since the translation result analysis section 9b is provided to analyze whether the test sentence has been translated as initially intended, the user may refer to only the analysis result of the sentence of which processing has failed, so that efficient maintenance work is possible.

Further, a dictionary and a thesaurus for the generation of sentences are prepared separately from those for the translation in the sentence generation so that it is possible to limit beforehand words that are to be included in the sentence. In this case, there is an effect that sentences including important words corresponding to the documents that the user wants can be generated efficiently while preventing preparation of meaningless sentences.

Each of the above-described embodiments shows only one example of the present invention, and the present invention is not limited to these.

As described above in detail, according to the present invention, a hypothesis is generated to prepare dictionary information based on analysis data and the like of sentences which are known to be correct in advance, sentences for verification are generated by using the hypothesis, sentence generation rules, dictionary information and thesaurus, and the user decides the adequacy of each sentence, such that dictionary information is generated. In other words, it becomes possible to realize a natural language processing system maintenance support method which makes it possible to easily perform maintenance of information of co-occurrence relation in the dictionary. Further, since it is possible to generate a variety of sentences for verification by the sentence generation section even if it is impossible to acquire comprehensive sentences in advance, it is possible to semi-automatically generate dictionary information based on the sentences and to verify grammer rules and dictionary information by using the generated sentences for experimental processing of the natural language processing system. In other words, it becomes possible to realize a natural language processing system maintenance support method which makes it possible to easily carry out comprehensive verification and correction of grammar rules and dictionary information.

I claim:

1. A maintenance support method for use in a maintenance support apparatus for a natural language processing system, the apparatus including:
   a sentence file for storing sentences and parsing data associated with the sentences;
   a dictionary for storing dictionary information;
   a thesaurus for storing semantic information; and
   a grammar rule file for storing
      analysis rules for parsing sentences in natural language based on the dictionary information in the dictionary, and
      sentence generation rules for transforming and synthesizing sentences in the sentence file to generate new sentences in natural language based on at least one of the dictionary information in the dictionary and the semantic information in the thesaurus;
   the method comprising the steps of:
   (a) extracting from the sentence file sentences having at least one word in common and the parsing data associated therewith;
   (b) generating a hypothesis of co-occurrence relation information from the sentences extracted from the sentence file and the parsing data extracted from the sentence file;
   (c) generating sentences from the hypothesis for verifying the hypothesis based on the sentence generation rules in the grammar rule file and at least one of the dictionary information in the dictionary and the semantic information in the thesaurus;
   (d) determining if each of the sentences generated from the hypothesis is adequate; and
   (e) generating dictionary information, including co-occurrence relation information, from the hypothesis and the sentences generated from the hypothesis which are determined to be adequate.

2. A method according to claim 1, wherein the step (a) includes the substeps of:
   (a1) specifying a word for which dictionary information is to be generated; and
   (a2) extracting from the sentence file sentences having the specified word in common and the parsing data associated therewith.

3. A method according to claim 2, wherein new sentences and parsing data associated therewith are intermittently added to the sentence file, and wherein the substep (a1) includes the substeps of:
   (a11) calculating a frequency of occurrence in the sentence file of each word in each sentence in the sentence file and adding the frequency of occurrence to the dictionary information in the dictionary as frequency data;
   (a12) repeating the substep (a11) when new sentences and parsing data associated therewith are added to the sentence file; and
   (a13) specifying the word for which dictionary information is to be generated based on the frequency data in the dictionary information in the dictionary.

4. A method according to claim 1, wherein the step (e) includes the substep of generating, as part of the generated dictionary information, a certainty factor representing a degree of adequacy of the co-occurrence relation information included in the generated dictionary information based on at least one of (1) the number of sentences from which the hypothesis was generated in the step (b), (2) the number of sentences generated from the hypothesis determined to be adequate in the step (d), and (3) a degree of abstraction of the hypothesis determined by reference to the semantic information in the thesaurus.

5. A method according to claim 4, wherein new sentences and parsing data associated therewith are intermittently added to the sentence file, and wherein the step (a) includes the substeps of:
   (a1) when new sentences and parsing data associated therewith are added to the sentence file, selecting words in the new sentences for which the dictionary information in the dictionary includes a certainty factor smaller than a predetermined certainty factor;
   (a2) specifying each of the selected words as a word for which dictionary information is to be generated; and
   (a3) extracting from the sentence file sentences having the specified word in common and the parsing data associated therewith.

6. A method according to claim 1, wherein the apparatus further includes means for translating sentences from one natural language into another natural language, and wherein the step (d) includes the substeps of:

(d1) translating the sentences generated from the hypothesis from one natural language into another natural language based on the analysis rules in the grammer rule file and the dictionary information in the dictionary; and (d2) determining if each of the sentences generated from the hypothesis is adequate based on both the sentences generated from the hypothesis and the translated sentences.

7. A method according to claim 1, wherein the dictionary has a restricted vocabulary of words for use in generating sentences, and wherein the step (c) includes the substep of generating sentences from the hypothesis for verifying the hypothesis by using words in the restricted vocabulary of the dictionary.

8. A maintenance support method for use in a maintenance support apparatus for a natural language processing system, the apparatus including:

a sentence file for storing sentences and parsing data associated with the sentences;

a dictionary for storing dictionary information;

a thesaurus for storing semantic information; and a grammar rule file for storing analysis rules for parsing sentences in natural language based on the dictionary information in the dictionary, and sentence generation rules for transforming and synthesizing sentences in the sentence file to generate new sentences in natural language based on at least one of the dictionary information in the dictionary and the semantic information in the thesaurus;

the method comprising the steps of:

(a) generating a new sentence and correct parsing data associated therewith by using one of (1) selected sentences in the sentence file and the parsing data associated therewith, the sentence generation rules in the grammar rule file, the dictionary information in the dictionary, and the semantic information in the thesaurus to transform and synthesize the selected sentences, and (2) the sentence generation rules in the grammar rule file, the dictionary information in the dictionary, and the semantic information in the thesaurus, wherein the correct parsing data includes a correct translation of the new sentence from one natural language to another natural language;

(b) storing the new sentence and the correct parsing data associated therewith in the sentence file;

(c) translating the new sentence from one natural language into another natural language by using the analysis rules in the grammar rule file, the dictionary information in the dictionary, and the semantic information in the thesaurus to generate translation result data associated with the new sentence, wherein the translation result data includes a translation of the new sentence; and (d) correcting at least one of the analysis rules in the grammar rule file, the sentence generation rules in the grammar rule file, and the dictionary information in the dictionary if the translation of the new sentence obtained in the translating step is different from the correct translation of the new sentence.

9. A method according to claim 8, wherein the step (a) includes the substeps of:

(a1) specifying words to be used in generating the new sentence; and (a2) generating the new sentence by using at least one of (1) sentences including the specified word extracted from the sentence file and parsing data associated with the sentences extracted from the sentence file, and (2) dictionary information for the specified words extracted from the dictionary information in the dictionary.

10. A method according to claim 9, wherein new sentences and parsing data associated therewith are intermittently added to the sentence file from, and wherein the substep (a1) includes the substeps of:

(a11) calculating a frequency of occurrence in the sentence file of each word in each sentence in the sentence file and adding the frequency of occurrence to the dictionary information in the dictionary as frequency data;

(a12) repeating the substep (a11) when new sentences and parsing data associated therewith are added to the sentence file; and (a13) specifying the words to be used in generating the new sentence based on the frequency data in the dictionary information in the dictionary.

11. A method according to claim 9, wherein the dictionary has a restricted vocabulary of words for use in generating a new sentence, and wherein the substep (a1) includes the substep of specifying words in the restricted vocabulary of the dictionary as the words to be used in generating the new sentence.

12. A maintenance support apparatus for a natural language processing system, the apparatus comprising:

a sentence file for storing sentences and parsing data associated with the sentences;

a dictionary for storing dictionary information;

a thesaurus for storing semantic information;

a grammar rule file for storing analysis rules for parsing sentences in natural language based on the dictionary information in the dictionary, and sentence generation rules for transforming and synthesizing sentences in the sentence file to generate new sentences in natural language based on at least one of the dictionary information in the dictionary and the semantic information in the thesaurus;

means for extracting from the sentence file sentences having at least one word in common and the parsing data associated therewith;

means for generating a hypothesis of co-occurrence relation information from the sentences extracted from the sentence file and the parsing data extracted from the sentence file;

means for generating sentences from the hypothesis for verifying the hypothesis based on the sentence generation rules in the grammar rule file and at least one of the dictionary information in the dictionary and the semantic information in the thesaurus;

means for enabling a human operator to determine if each of the sentences generated from the hypothesis is adequate; and means for generating dictionary information, including co-occurrence relation information, from the hypothesis and the sentences generated from the hypothesis which are determined by the human operator to be adequate.

* * * * *